Figure 1:
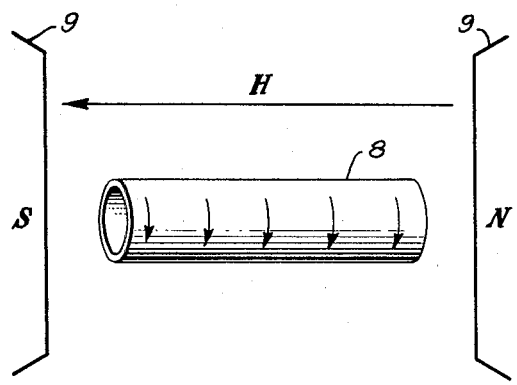

Nov. 10, 1964    G. K. WALTERS    3,156,850
METHOD OF PROVIDING A REGULATED MAGNETIC FIELD
Filed Dec. 31, 1958

INVENTOR
*Geoffrey K. Walters*

BY *Stevens, Davis, Miller & Mosher*
ATTORNEYS

United States Patent Office 3,156,850
Patented Nov. 10, 1964

3,156,850
METHOD OF PROVIDING A REGULATED MAGNETIC FIELD
Geoffrey K. Walters, Dallas, Tex., assignor to Texas Instruments Incorporated, Dallas, Tex., a corporation of Delaware
Filed Dec. 31, 1958, Ser. No. 784,305
3 Claims. (Cl. 317—123)

This invention relates to a method for providing a highly regulated magnetic field making use of the phenomenon of superconductivity. This invention also relates to a method and apparatus for suddenly changing the strength of a magnetic field from any desired value to any other desired value utilizing the phenomenon of superconductivity.

In research, a highly regulated magnetic field is desirable. Prior to the present invention, such regulated fields were provided by electromagnets and depended upon the regulation of the energizing current for their regulation. Permanent magnets are sometimes used when the strength of the magnetic field does not have to be adjustable to any selected value. The present invention provides a way of achieving a magnetic field which is more precisely regulated than the field produced by an electromagnet method which is less expensive to produce than by the electromagnet method, and yet can be easily adjusted so that any selected regulated field within limits which will not destroy the superconductive properties of the device may be produced. The useful range of the invention will be dependent upon the material and temperature used. Because the invention makes use of the phenomenon of superconductivity, it is particularly applicable to low temperature experiments.

In research it is also often desirable to subject an object or a sample to a magnetic field, the strength of which suddenly changes from one value to another, or in other words a magnetic field, the strength of which varies as a step function.

To produce such a step function with conventional electromagnetic equipment, the high inductance of the energizing windings producing the field must be overcome. This problem is made exceedingly difficult as it is desired that the strength of the magnetic field change almost instantaneously. The only way any semblance of a step function was achieved prior to the present invention was by using expensive, extremely high-powered driving equipment for the energizing field. By means of the present invention, a magnetic field step function can be easily and inexpensively obtained.

The invention utilizes a shell with open ends comprising a material which becomes superconductive below a transition temperature. While the temperature is above the transition temperature, the magnetic field is adjusted to the desired value. The cylindrical shell is aligned axially with this magnetic field so that the flux lines pass through the cylindrical shell and the temperature of the shell is then lowered below the transition temperature. After the temperature of the shell has been thus lowered, the field within the cylindrical shell will remain constant even though the applied magnetic field varies and thus a very highly regulated magnetic field is obtained.

In another form the invention makes use of two superconducting rings, each with a control winding which can destroy the superconductivity of part of the ring. The two rings are positioned in an externally produced magnetic field so that the magnetic field links the two rings. While the two rings are in a superconducting state, the externally applied field is changed to a selected value. The field linking the two rings, however, will remain constant because the rings are superconducting. The superconductivity of part of each of the rings is then destroyed by the control windings. The strength of the field linking the two rings will then immediately jump to the selected value to which the externally applied magnetic field was increased. Thus, the field linking the two coils is varied as a step function and a sample placed between the two rings will have this magnetic field step function applied thereto. Thus a magnetic field step function for experimental research is simply and inexpensively provided.

Accordingly it is an object of this invention to provide a novel method and apparatus which utilizes superconductivity principles to obtain a regulated magnetic field of a high order.

It is another object of this invention to provide a method and apparatus which utilizes superconductivity principles to suddenly change the strength of a magnetic field from one desired value to another desired value.

Figure 2:
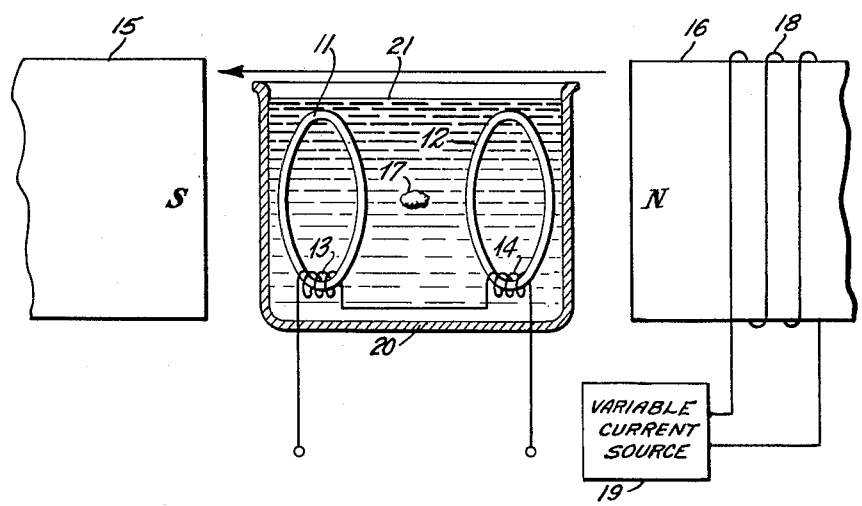

Other objects and advantages of the invention will become readily apparent as the following description of a preferred embodiment of the invention unfolds and when taken in conjunction with the drawings in which:

FIGURE 1 illustrates the method and apparatus of the invention for obtaining a regulated magnetic field of a high order; and FIGURE 2 illustrates the technique for suddenly changing the value of an applied magnetic field.

As shown in FIGURE 1, the method makes use of an annulus 8 shown as a cylindrical or tubular shell which comprises a material which becomes superconducting below a transition temperature. The method also makes use of a means for producing a variable magnetic field comprising the poles 9. While the tubular shell 8 is maintained at a temperature above the transition temperature, the shell 8 is positioned as shown so that the magnetic flux lines pass axially through the shell. Also, while the temperature of the shell is maintained above the transition temperature, the strength of the magnetic field produced by the poles 9 is adjusted to the desired value. After the shell 8 is positioned and the strength of the magnetic field is adjusted, the temperature of the shell 8 is reduced below the transition temperature so that the shell becomes superconducting. After the shell 8 becomes superconducting, the flux passing through the cylindrical shell must remain constant and any change in the field produced by the poles 9 will be compensated by currents around the circumference of the shell 8. Thus the region in the center of the shell will be extremely well regulated.

As shown in FIGURE 2, the appartaus of this embodiment of the invention comprises two rings 11 and 12. These two rings are each made of material which becomes superconducting below a transition temperature. Wound around each of the rings 11 and 12 are control windings 13 and 14, respectively, which are connected in series. The two rings 11 and 12 are spaced apart in parallel planes so that they are axially aligned. A means for producing a variable magnetic field, comprising poles 15 and 16, a winding 18, and a variable current source 19, produces a magnetic field which links the two rings 11 and 12. Means are provided to maintain the temperature of the rings 11 and 12 below their transition temperatures. This may be, for example, a container 20 of liquid helium 21, in which the rings 11 and 12 would be immersed.

A current flowing through the series connected windings 13 and 14 will produce a magnetic field which will destroy the superconductivity of part of each of the rings 11 and 12. According to the method of invention, the variable field produced by the poles 15 and 16 is adjusted to a first selected value while current is flowing in the control windings 13 and 14, thus maintaining parts of the rings 11 and 12 in a nonsuperconducting state. After the applied magnetic field is adjusted to the first selected value, the current is removed from the control windings thus causing the rings 11 and 12 to become entirely superconducting. The magnetic field applied by the poles 15 and 16 is adjusted to a second selected value. The field linking the two rings 11 and 12 will remain constant during this step as the flux linking a superconducting ring will not change. After the field applied by the poles 15 and 16 reaches the second selected value, the current is again applied to the windings 13 and 14 to destroy superconductivity of part of each of the rings 11 and 12. When this superconductivity is destroyed, the flux linking the two rings will no longer remain constant and will jump to the second selected value. Thus the flux linking the two rings 11 and 12 will vary as a step function. A sample 17 may be placed between the two rings 11 and 12 and will have this magnetic field step function applied thereto.

The method of the invention may be practiced with a single ring of material in the form of an annulus such as a tubular shell instead of the two rings 11 and 12. With such a tubular shell or ring the control winding would be wound on the shell in the same manner as the control windings 13 and 14 are wound on the rings 11 and 12. The use of such a shell would reduce the end effects which are present when rings are used. However, it would be more difficult to position a sample where the magnetic field step function would be applied to it.

Any suitable material can be used in the invention which has the necessary properties. Examples of materials which become superconducting are niobium, tin, vanadium, tantalum and lead alloys.

The above description is of preferred embodiment of the method of the invention and many modifications may be made thereto without departing from the spirit and scope of the invention which is limited only as defined in the appended claims.

What is claimed is:

1. An appartaus for producing a magnetic field step function comprising a means for producing a variable magnetic field, a pair of axially aligned rings spaced from one another and positioned so that the field produced by said magnetic field producing means would normally link said rings, said rings comprising a material which is normally superconducting below a transition temperature, means to maintain the temperature of said rings below said transition temperature, an electrical winding on each of said rings and means to apply current to said electrical windings thereby generating a magnetic field sufficient to destroy the superconductivity in at least a part of each of said rings.

2. An apparatus for providing a magnetic field step function comprising a means for producing a variable magnetic field, a pair of axially aligned rings spaced from one another and positioned so that the field produced by said magnetic field producing means would normally link said rings, said rings comprising a material which is normally superconducting below a transition temperature, means to maintain said rings below said transition temperature, and means to destroy the superconductivity in at least a part of each of said rings.

3. A method of providing a magnetic field step function utilizing at least two rings of material which may be controlled to be superconducting comprising the steps of generating a magnetic field, positioning said rings so that the generated magnetic field will link said rings when the material of said rings is not superconducting, controlling said rings to be superconducting, then adjusting said magnetic field so that a different strength magnetic field would link said rings were it not superconducting, and then destroying the superconductivity of part of said rings.

References Cited by the Examiner

UNITED STATES PATENTS 3,091,702   5/63   Slade _____ 307—88.5

OTHER REFERENCES

"An analysis of the Operation of a Persistent-Supercurrent Memory Cell," by R. L. Garwin, article in IBM Journal, October 1957, pp. 304–308.

"Proceedings of the Symposium on the Role of Solid State Phenomena in Electric Circuits," distributed by Interscience Publishers (1957), pages 187 to 195.

SAMUEL BERNSTEIN, *Primary Examiner.*